US012601952B2

(12) United States Patent
Chen et al.

(10) Patent No.: US 12,601,952 B2
(45) Date of Patent: Apr. 14, 2026

(54) LENS STRUCTURE

(71) Applicant: LIQXTAL TECHNOLOGY INC.,
Tainan City (TW)

(72) Inventors: Hung-Shan Chen, Tainan City (TW);
Sung-Nan Chen, Tainan City (TW);
Ming-Syuan Chen, Tainan City (TW)

(73) Assignee: LIQXTAL TECHNOLOGY INC.,
Tainan City (TW)

( * ) Notice: Subject to any disclaimer, the term of this
patent is extended or adjusted under 35
U.S.C. 154(b) by 309 days.

(21) Appl. No.: 18/239,761

(22) Filed: Aug. 30, 2023

(65) Prior Publication Data

US 2025/0076728 A1     Mar. 6, 2025

(51) Int. Cl.
*G02F 1/29* (2006.01)
(52) U.S. Cl.
CPC ..................................... *G02F 1/294* (2021.01)
(58) Field of Classification Search
None
See application file for complete search history.

(56) References Cited

U.S. PATENT DOCUMENTS

| | | | | |
|---|---|---|---|---|
| 4,904,063 A * | 2/1990 | Okada | ......................... | G02F 1/29 |
| | | | | 349/200 |
| 11,442,332 B1 * | 9/2022 | Sprague | .................. | G02C 7/083 |
| 2011/0267570 A1 * | 11/2011 | Saito | ......................... | G02F 1/292 |
| | | | | 349/139 |

| | | | | |
|---|---|---|---|---|
| 2013/0037202 A1 * | 2/2013 | Ando | ..................... | G02F 1/1341 |
| | | | | 156/99 |
| 2013/0107186 A1 * | 5/2013 | Ando | .............. | B29D 11/00817 |
| | | | | 349/153 |
| 2016/0097948 A1 * | 4/2016 | Chin | .................. | G02F 1/134309 |
| | | | | 349/123 |
| 2018/0022642 A1 * | 1/2018 | Liu | ........................ | C23C 28/023 |
| | | | | 428/210 |
| 2021/0231978 A1 * | 7/2021 | Wang | ........................ | G02B 3/08 |
| 2022/0390768 A1 | 12/2022 | Kubota | | |
| 2024/0103335 A1 * | 3/2024 | Melakari | ................ | G02C 11/10 |

FOREIGN PATENT DOCUMENTS

| | | |
|---|---|---|
| CN | 1498353 A | 5/2004 |
| TW | 200921178 | 5/2009 |
| TW | 201937246 A | 9/2019 |

* cited by examiner

*Primary Examiner* — Ryan Crockett
(74) *Attorney, Agent, or Firm* — Winston Hsu

(57) ABSTRACT

A lens structure includes a first substrate, located in a first
layer; a second substrate, located in a second layer; a first
adhesive material layer, located in the second layer and
located above the second substrate, wherein the adhesive
material layer located in a first region of the second layer is
a surface relief structure; a first conductive layer, located in
a second region of the first layer corresponding to a pro-
jected position of the first region, and located under the first
substrate; a second conductive layer, located in the second
layer and located above the first adhesive material layer; and
a first electrically controlled refractive index layer, located
in a third region of a third layer corresponding to a projected
position of the first region, wherein the third layer is beneath
the first layer and above the second layer.

10 Claims, 8 Drawing Sheets

TFT LC panel

LENS STRUCTURE

BACKGROUND OF THE INVENTION

1. Field of the Invention

The present invention relates to a lens structure, and more particularly, to a lens structure having regions for electrically controlling refractive index.

2. Description of the Prior Art

The human eye has various needs for vision correction, such as myopia, presbyopia, astigmatism, or a combination of two or more. Therefore, a single function, for example, a single degree of myopia, on an optical lens cannot meet the needs of users. However, current glasses with different degrees of correction, such as bifocals and progressive glasses, largely limit the user's field of vision.

Under these circumstances, designing optical lenses with various regions that can be actively adjusted has become one of the goals in the industry.

SUMMARY OF THE INVENTION

The present invention is to provide a lens structure to solve the above problems.

The present invention provides a lens structure, comprising a first substrate, located in a first layer; a second substrate, located in a second layer; a first adhesive material layer, located in the second layer and located above the second substrate, wherein the adhesive material layer located in a first region of the second layer is a surface relief structure; a first conductive layer, located in a second region of the first layer corresponding to a projected position of the first region, and located under the first substrate; a second conductive layer, located in the second layer and located above the first adhesive material layer; and a first electrically controlled refractive index layer, located in a third region of the third layer corresponding to a projected position of the first region, wherein the third layer is beneath the first layer and above the second layer.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, hardware manufacturers may refer to a component by different names. This document does not intend to distinguish between components that differ in name but not function. In the following description and in the claims, the terms "include" and "comprise" are utilized in an open-ended fashion, and thus should be interpreted to mean "include, but not limited to". Also, the term "couple" is intended to mean either an indirect or direct electrical connection. Accordingly, if one device is coupled to another device, that connection may be through a direct electrical connection, or through an indirect electrical connection via other devices and connections.

Figures 1A, 1B:
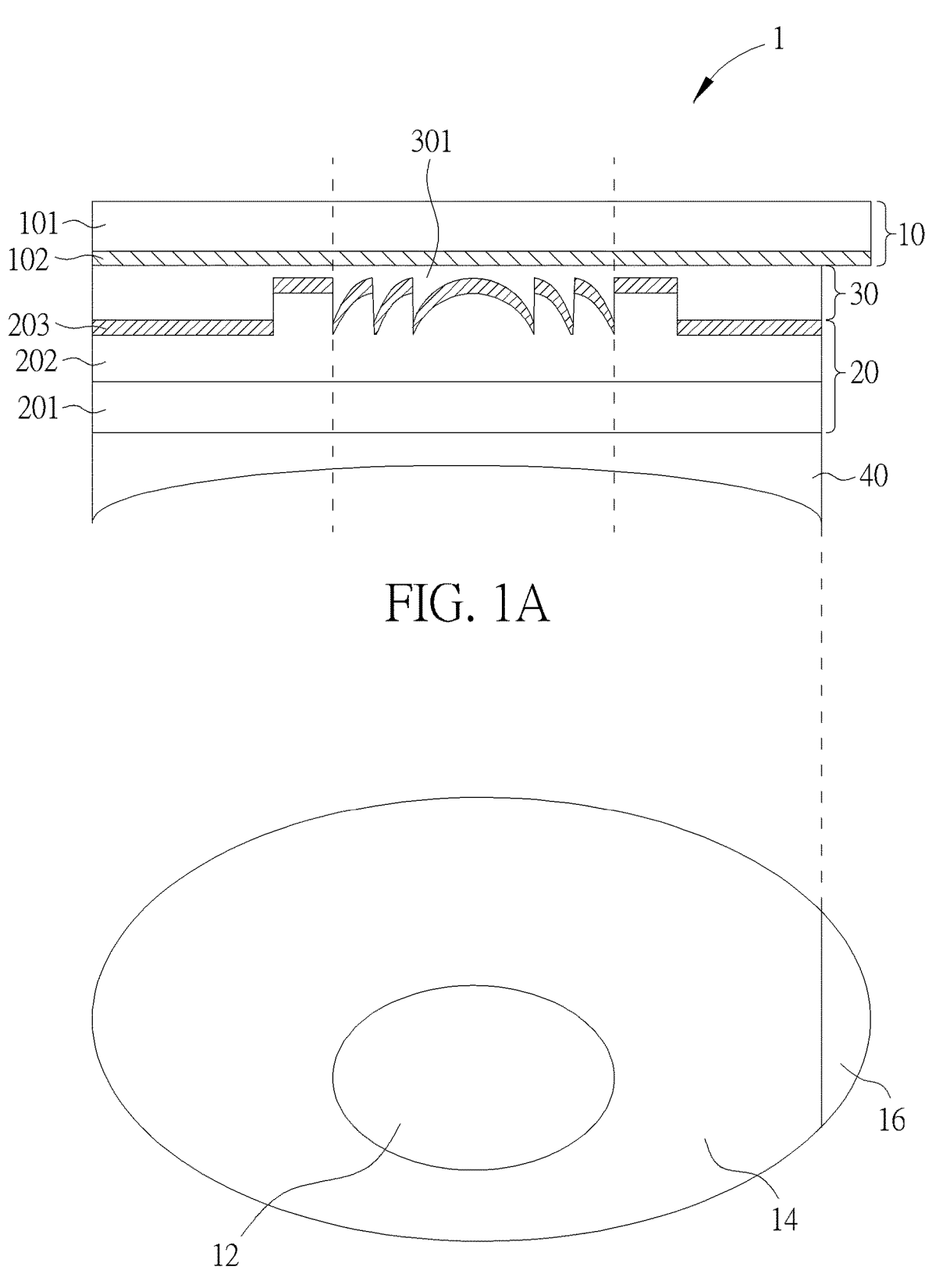
FIGS. 1A and 1B are schematic diagrams of a side view and a top view of a lens structure according to an embodiment of the present invention.

Please refer to FIGS. 1A and 1B. FIGS. 1A and 1B are schematic diagrams of a side view and a top view, respectively, of a lens structure 1 according to an embodiment of the present invention. As shown in FIG. 1A, the lens structure 1 includes a first layer 10, a second layer 20 and a third layer 30. The first layer 10 includes a first substrate 101 and a first conductive layer 102 located beneath the first substrate 101. The second layer 20 includes a second substrate 201, a first adhesive material layer 202 located on top of the second substrate 201, and a second conductive layer 203 located above the first adhesive material layer 202. It should be noted that the first substrate 101 and the second substrate 201 may be made of glass or flexible material. In addition, there may be no gap between the first substrate 101 and the first adhesive material layer 202. Alternatively, there may be rod-shaped, granular or photoresist gaps filled between the first substrate 101 and the first adhesive material layer 202. The third layer 30 includes a first electrically controlled refractive index layer 301 located in a third region corresponding to the projection position of the first viewing region 12, and is situated below the first layer 10 and above the second layer 20. Additionally, a base lens layer 40 may be positioned beneath the second substrate 201, on top of the first layer 101, or both. The base lens layer 40 may incorporate vision correction functions, such as myopia, presbyopia, astigmatism, or progressive diopters, but not limited thereto. The structure of the base lens layer 40 may be curved surface, optical waveguide, surface relief, or liquid crystal polymer.

Furthermore, for the lens structure 1 to have a plurality of viewing regions, including an adjustable viewing region, please refer to FIG. 1B. In the embodiment, the present invention divides the lens structure 1 into a first viewing region 12 and a second viewing region 14. As shown in FIGS. 1A and 1B, the first adhesive material layer located in a first region corresponding to a projection position of the first viewing region 12 may have a surface relief structure. For instance, the surface relief structure may be produced using nanoimprinting lithography (NIL), roll-to-roll NIL or roll-to-stage NIL processes. It should be noted that, the second conductive layer 203 located above the first adhesive material layer 202 in the first region also has a surface relief structure. By applying voltages to the first conductive layer 102 and the second conductive layer 203, a refractive index of the first electrically controlled refractive index layer 301 may be altered, allowing the first viewing region 12 and the second viewing region 14 to have different functions. On the other hand, the focal points of the base lens layer 40, the first viewing region 12 and the second viewing region 14 may be the same or different. In addition, the lens structure 1 further has an electrode region 16. Electrodes may be disposed on the electrode region 16 to apply voltages to the first conductive layer 102 and the second conductive layer 203.

Figure 2A:
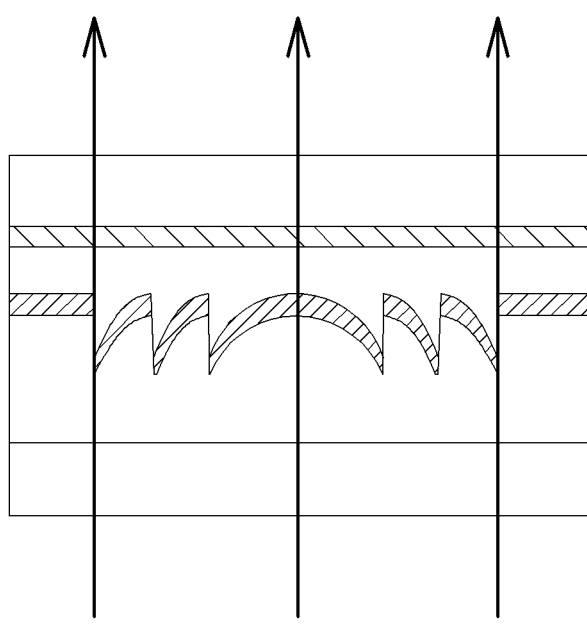
FIGS. 2A and 2B are schematic diagrams of light passing through a first viewing region of the lens structure according to the embodiment of the present invention.
Figure 2B:
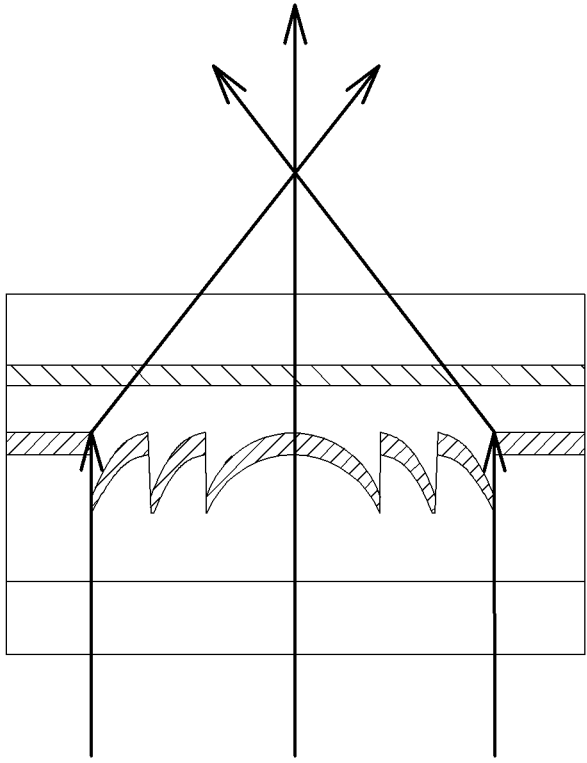

In brief, when no voltage is applied to the first conductive layer 102 and the second conductive layer 203, the first electrically controlled refractive index layer 301 has a first refractive index. When voltage is applied to the first conductive layer 102 and the second conductive layer 203, the first electrically controlled refractive index layer 301 has a second refractive index. Please refer to FIGS. 2A and 2B. FIGS. 2A and 2B are schematic diagrams of light passing through the first viewing region 12 of the lens structure. As depicted in FIG. 2A, when there is no voltage applied, light passes straight through the first viewing region 12. In comparison, as shown in FIG. 2B, when voltage is applied, the angle of light changes as it passes through the first electrically controlled refractive index layer 301, due to the change in the refractive index (from the first refractive index to the second refractive index).

Figure 3A:
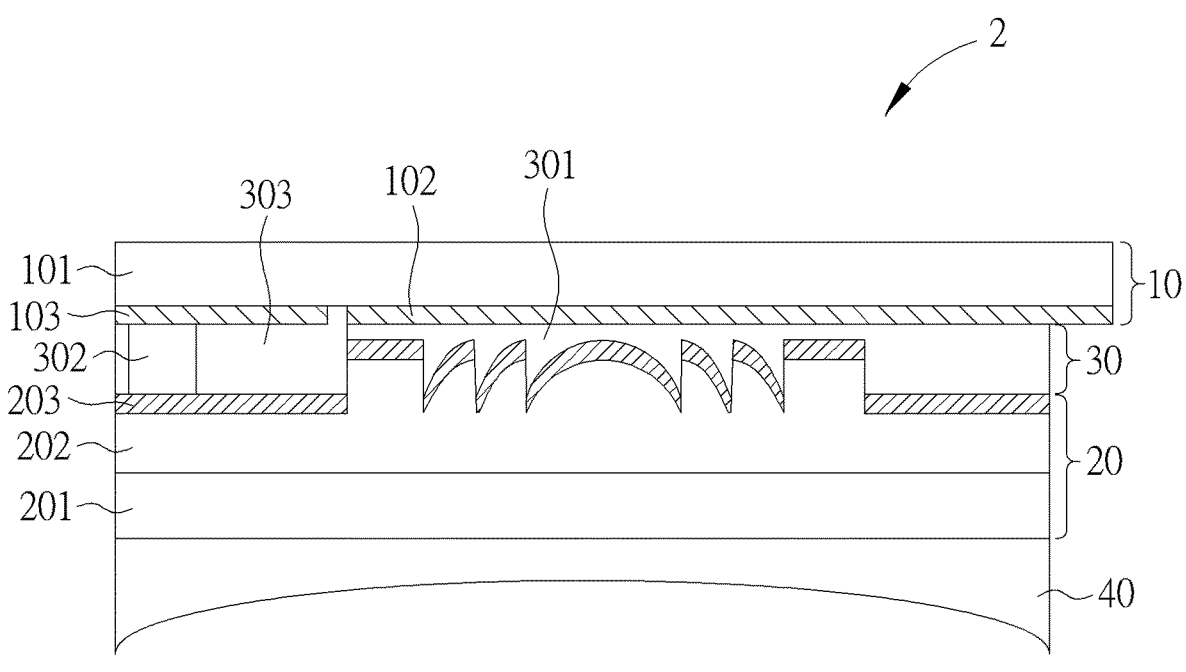
FIGS. 3A and 3B are schematic diagrams of lens structures according to embodiments of the present invention.
Figure 3B:
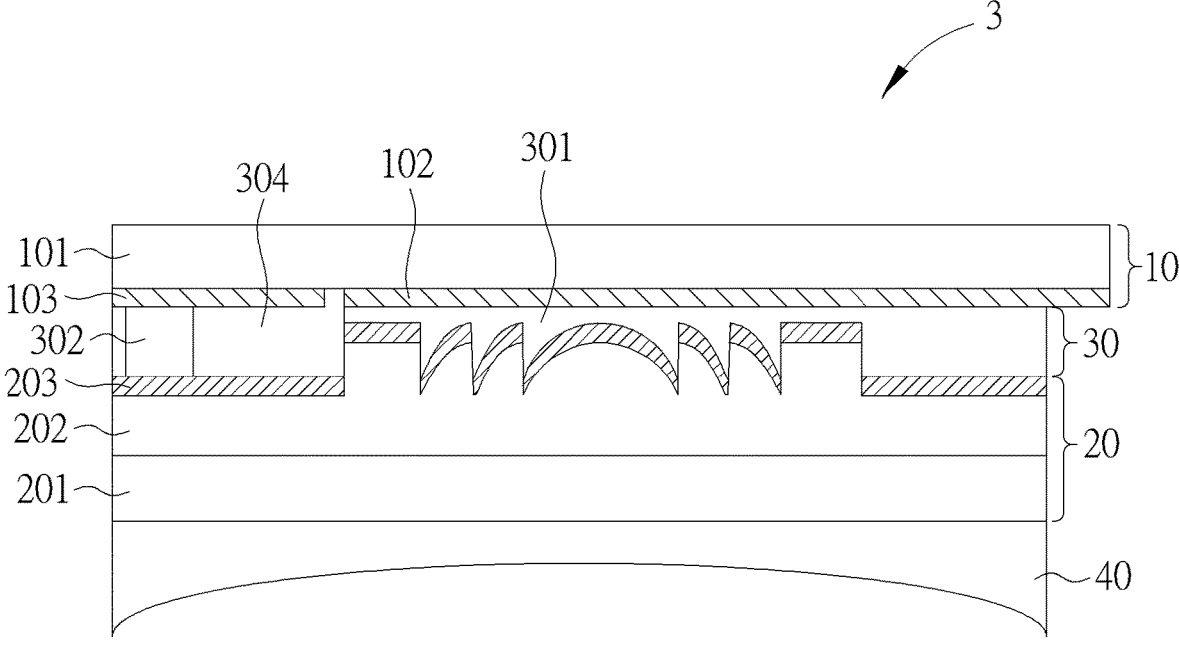

On the other hand, in order to apply voltage to the first conductive layer 102 and the second conductive layer 203, another embodiment extends the second conductive layer 203 into the first layer 10, allowing the voltage to be conveniently applied to the electrodes located on the first substrate 101 for controlling the refractive index. Please refer to FIGS. 3A and 3B. FIGS. 3A and 3B are schematic diagrams of lens structures 2 and 3 according to embodiments of the present invention. The lens structures 2, 3 and other lens structure described below are derived from the lens structure 1, so the layers are denoted by the same symbols. The difference between the lens structure 1 and the lens structure 2 is that the first layer 10 of the lens structure 2 further includes a third conductive layer 103 and the second layer 20 of the lens structure 2 further includes a conductive via 302. In detail, the first conductive layer 102 is located in a second region corresponding to the projection position of the first viewing region 12, the third conductive layer 103 is located in a fifth region corresponding to the projection position of the second viewing region 14, and the conductive via 302 is located in a fourth region corresponding to the projection position of the second viewing region 14 for electrically connecting the second conductive layer 203 and the third conductive layer 103. It should be noted that the third conductive layer 103 is not electrically connected to the first conductive layer 102. In this way, the voltage may be conveniently applied to the electrodes (not shown in FIGS. 3A-3B) on the first substrate 101, and transmitted to the second conductive layer 203 through the third conductive layer 103 and the conductive via 302.

Furthermore, the fourth region of the third layer 30 may have different material layers, resulting in the second viewing region 14 having different functions. As shown in FIG. 3A, a second electrically controlled refractive index layer 303 may be located in the fourth region of the third layer 30, or the first electrically controlled refractive index layer 301 may extend and be located in the fourth region. As shown in FIG. 3B, a second adhesive material layer 304 may be located in the fourth region of the third layer 30.

Figure 4A:
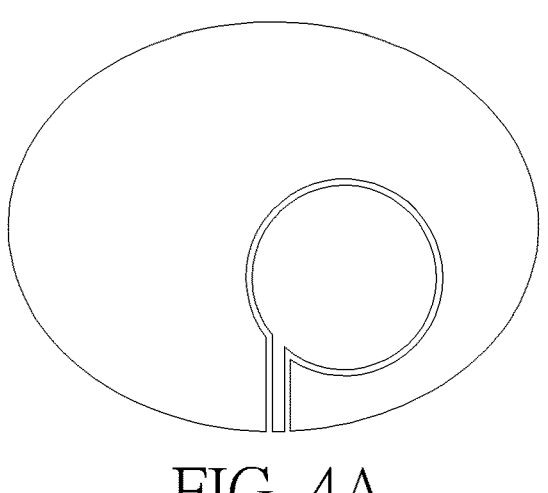
FIGS. 4A-4C are schematic diagrams of the top view of a plurality of conductive layers according to an embodiment of the present invention.
Figure 4B:
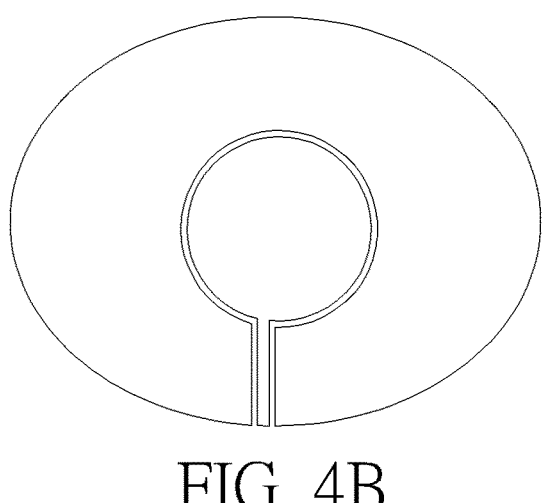
Figure 4C:
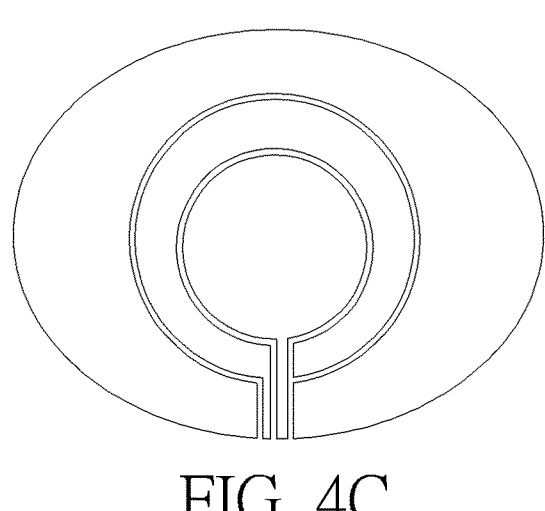

Specifically, the first conductive layer 102 and the third conductive layer 103 may be made through patterned conductive material. Please refer to FIGS. 4A, 4B and 4C. FIGS. 4A-4C are schematic diagrams of the top view of a plurality of conductive layers. As shown in FIGS. 4A-4B, by changing a relative position of the first conductive layer 102 and the third conductive layer 103, the region to be controlled by the voltage may be defined. In addition, as shown in FIG. 4C, more conductive layers (more than three) may be patterned in the first layer 10, and voltages may be applied separately to realize more viewing regions with different functions. For example, as shown in FIG. 1B, the lens structure 1 may be used as a lens in presbyopia glasses. The first viewing region 12 is located on the lower edge of the lens structure 1. In this way, users may read through the first viewing region 12 to relieve the effects of presbyopia.

Figure 5:
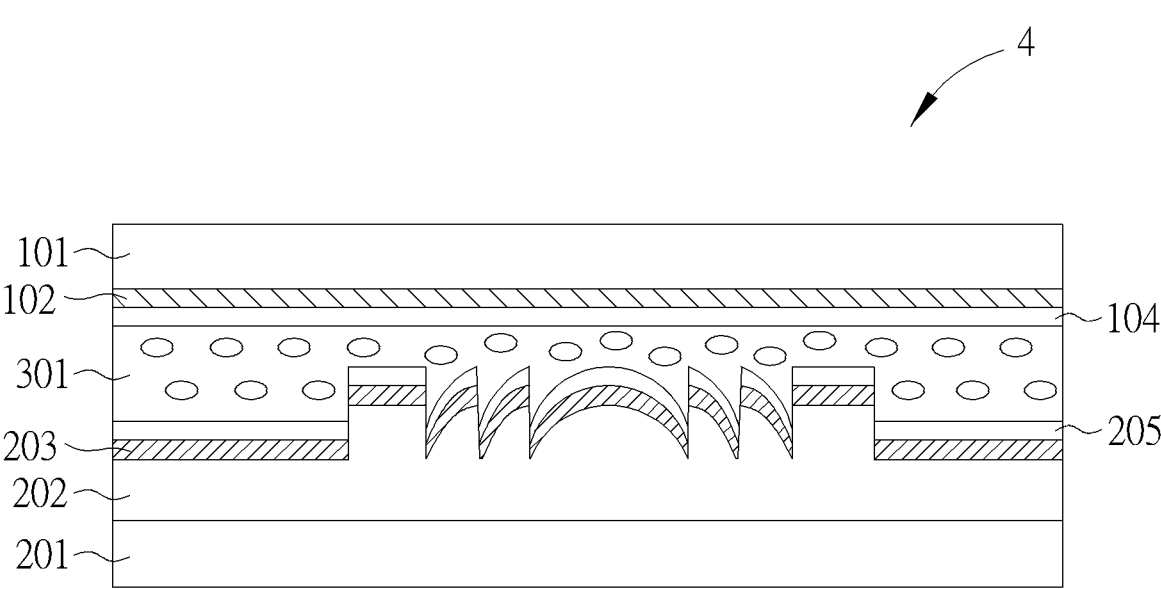
FIG. 5 is a schematic diagram of a lens structure according to an embodiment of the present invention.

In another embodiment, the material of the first electrically controlled refractive index layer 301 may be a nematic liquid crystal, cholesteric liquid crystal or nano-size polymer dispersed liquid crystal. Please refer to FIG. 5. FIG. 5 is a schematic diagram of a lens structure 4 according to an embodiment of the present invention. Because the first electrically controlled refractive index layer 301 is made of the liquid crystal material, the first layer 10 also includes a first alignment layer 104 located below the first conductive layer 102, and the second layer 20 includes a second alignment layer 205 located above the second conductive layer 203. Therefore, the first alignment layer 104 and the second alignment layer 205 may control the orientation of the liquid crystals in the first electrically controlled refractive index layer 301. In addition, the first layer 10 may include a thin-film transistor (TFT) array on the first substrate 101 to control the first electrically controlled refractive index layer 301 by pixelation.

Figure 6A:
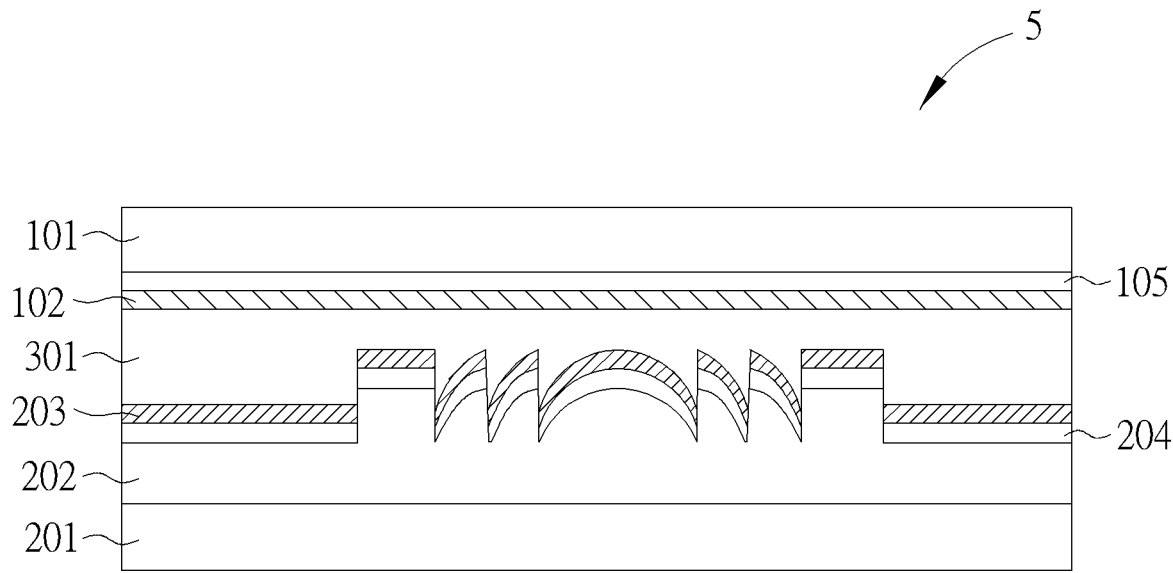
FIGS. 6A and 6B are schematic diagrams of lens structures according to embodiments of the present invention.
Figure 6B:
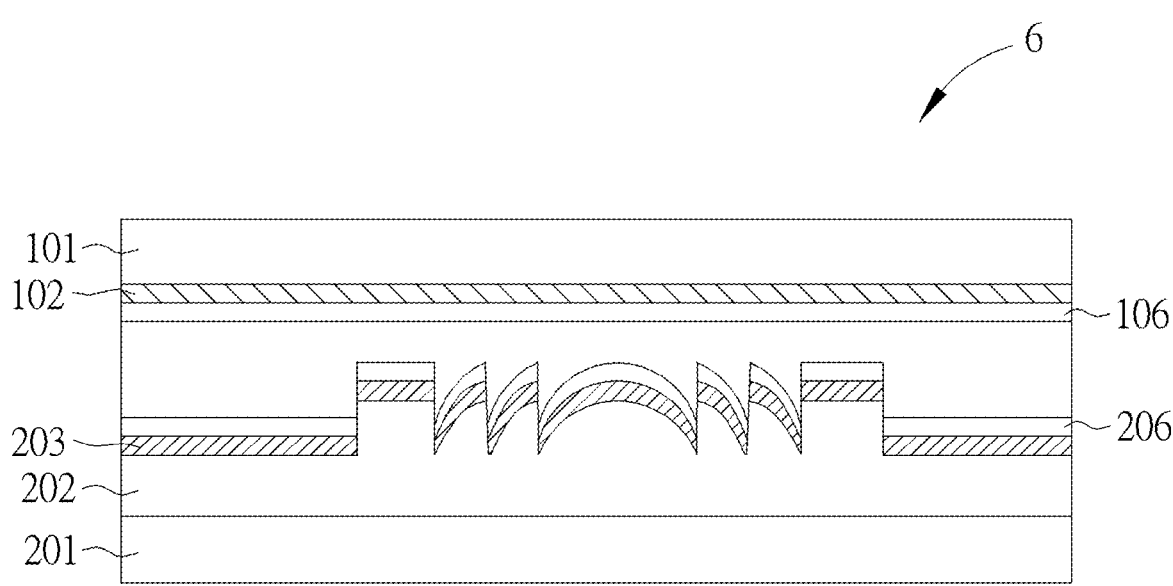

In some embodiments, the lens structure may have other varieties. Please refer to FIGS. 6A and 6B. FIGS. 6A and 6B are schematic diagrams of lens structures 5 and 6 according to embodiments of the present invention. As shown in FIG. 6A, the material of the first conductive layer 102 and the second conductive layer 203 may be Indium Tin Oxide (ITO). The refractive index of ITO ranges from 1.8 to 2.1, while the refractive index of liquid crystal materials ranges from 1.5 to 1.8. This mismatch of refractive index between ITO and liquid crystal may result in increased light reflectance and decreased light transmittance. To address this issue, the first layer 10 may include a first refractive index matching layer 105 located between the first substrate 101 and the first conductive layer 102, and the second layer 20 may include a second refractive index matching layer 204 between the first adhesive material layer 202 and the second conductive layer 203. This helps reduce the light reflectance of the lens structure 5.

On the other hand, as shown in FIG. 6B, in order to prevent a short circuit caused by the first conductive layer 102 contacting the second conductive layer 203 after assembly of the lens structure 6, the first layer 10 may further include a first insulation layer 106 beneath the first conductive layer 102, and the second layer 20 may further include a second insulation layer 206 above the second conductive layer 203. In this way, even if the first layer 10 makes partial contact with the second layer 20, it will not result in a short circuit.

Figure 7A:
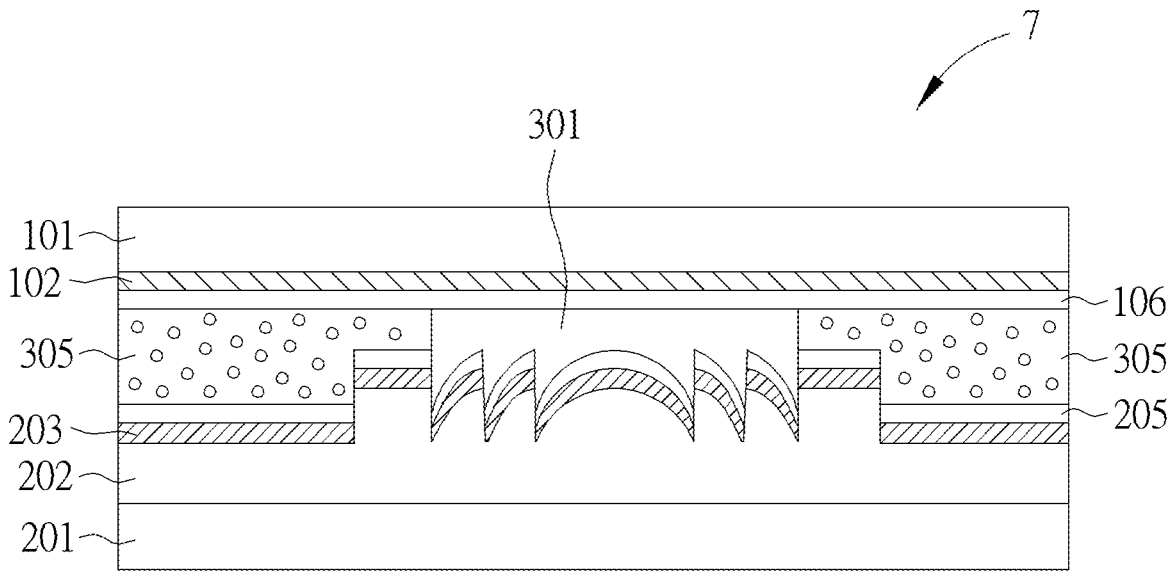
FIG. 7A is a schematic diagram of a lens structure according to the embodiment of the present invention.
Figure 7B:
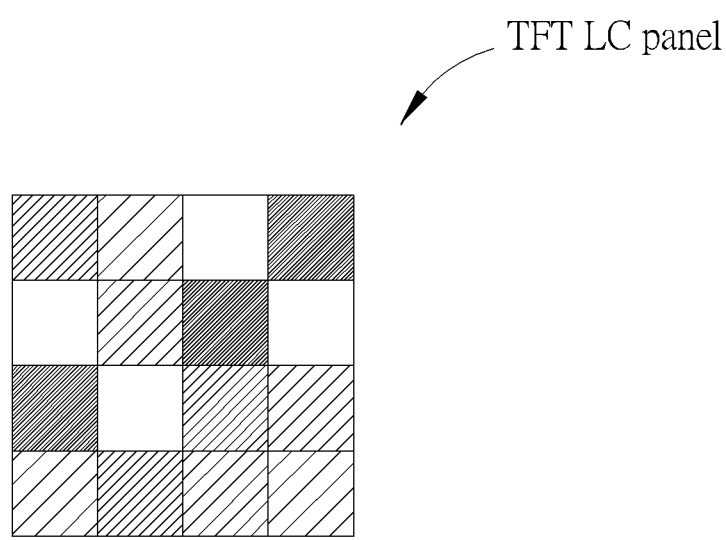
FIG. 7B is a schematic diagram of a pixelated amplitude modulation according to an embodiment of the present invention.

In another embodiment, please refer to FIG. 7A. FIG. 7A is a schematic diagram of a lens structure 7 according to the embodiment of the present invention. As shown in FIG. 7A, the first layer 10 includes an electrically controlled transmittance layer 305 in the fourth region of the third layer corresponding to the projection position of the second viewing region 14. The material of the electrically controlled transmittance layer 305 may be a nematic liquid crystal doped with dichroic dye or a cholesteric liquid crystal doped with dichroic dye. This allows the second viewing region 14 to adjust an intensity of light entering the human eye by applying a voltage. The lens structure may further have a TFT LC panel layer for pixelated amplitude modulation. The liquid crystal mode of the TFT LC panel may be twisted nematic (TN), electrically controlled birefringence (ECB), vertical alignment (VA), in-plane switching (IPS), or liquid crystal doped with dichroic dye. As further shown in FIG. 7B, the pixelated amplitude modulation controls the intensity of light at different positions on the lens structure.

Figure 8A:
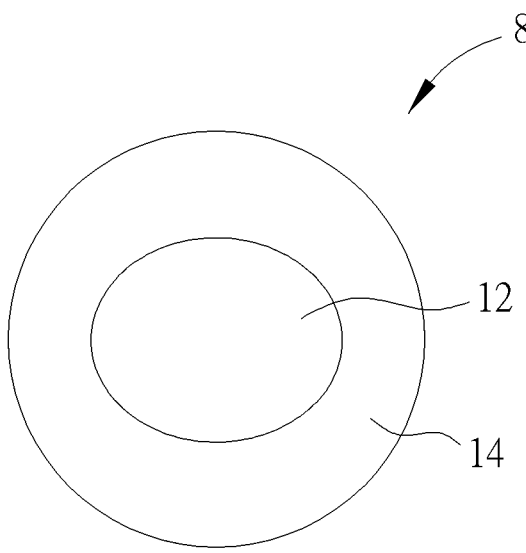
FIGS. 8A and 8B are schematic diagrams of lens structures according to embodiments of the present invention.
Figure 8B:
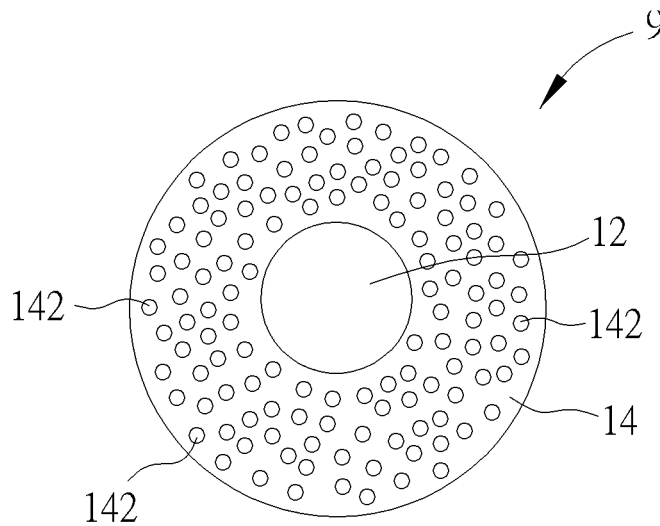
Figure 8C:
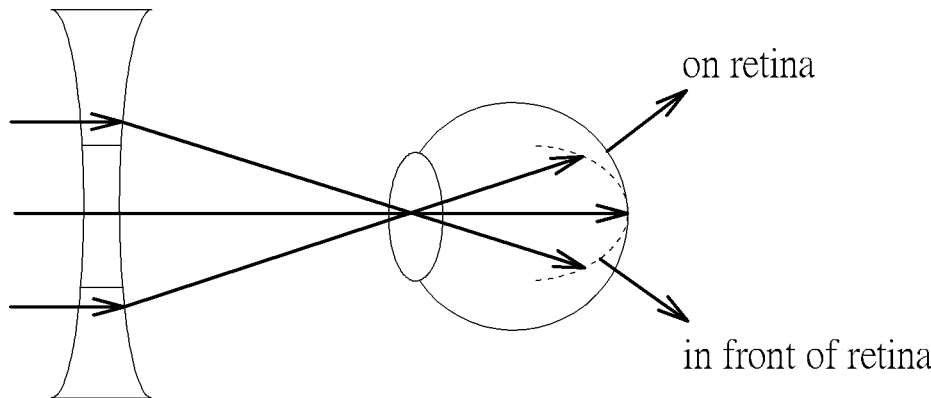
FIG. 8C is a schematic diagram of light passing through the lens structures according to an embodiment of the present invention.

The lens structure may also be used for myopia prevention. Please refer to FIGS. 8A, 8B and 8C. FIGS. 8A and 8B are schematic diagrams of lens structures 8 and 9 according to embodiments of the present invention. The first viewing region 12 of the lens structures 8 and 9 is a clear view region, where light passing through the first viewing region 12 is focused on the user's retina (as shown in FIG. 8C). On the other hand, the second viewing region 14 of the lens structures 8 and 9 are unclear viewing regions, where light passing through the second viewing region 14 is focused in front of the user's retina (as shown in FIG. 8C). It is worth noting that the second viewing region 14 of the lens structure 9 may use a microlens array 142 to focus light in front of the user's retina. In this way, using the lens structures 8 and 9 may prevent the user's eye axis from becoming elongated and avoid the occurrence of myopia.

Finally, lenses fabricated using the various lens structure described above may be arranged on a glasses frame having a controller or a driving circuit. The controller or the driving circuit may utilize a flexible circuit board contact the electrodes to apply voltages to the lenses to realize various electrically control functions. In addition, the controller or the driving circuit may have an eye-safety function. When detecting the lenses is cracked, the resistance value or the capacitance value is abnormal, the controller may stop applying voltages to lenses.

In summary, the lens structure of the present invention has multiple viewing regions that may be adjusted electronically (e.g. bifocals, progressive glasses). This allows for greater flexibility and customization, as the user can switch between different viewing regions to suit the user's needs, without being restricted by the field of vision.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lens structure, comprising:
a first substrate, located in a first layer;
a second substrate, located in a second layer;

a first adhesive material layer, located in the second layer and located above the second substrate, wherein the adhesive material layer located in a first region of the second layer is a surface relief structure;
a first conductive layer, located in a second region of the first layer corresponding to a projected position of the first region, and located under the first substrate;
a second conductive layer, located in the second layer and located above the first adhesive material layer;
a first electrically controlled refractive index layer, located in a third region of a third layer corresponding to a projected position of the first region, wherein the third layer is beneath the first layer and above the second layer; and
a conductive via, located in a fourth region of the third layer, for electrically connecting the second conductive layer and a third conductive layer located in a fifth region of the first layer corresponding to a projected position of the third region, wherein the third conductive layer is not electrically connected to the first conductive layer.

2. The lens structure of claim 1, further comprising:
a first insulating layer, located in the first layer and located under the first conductive layer; or
a second insulating layer, located in the second layer and located above the second conductive layer.

3. The lens structure of claim 1, further comprising:
a first alignment layer, located in the first layer and located under the first conductive layer; and
a second alignment layer, located in the second layer and located above the second conductive layer.

4. The lens structure of claim 1, further comprising:
a first refractive index matching layer, located in the first layer and located between the first conductive layer and the first substrate; and
a second refractive index matching layer, located in the second layer and located between the second conductive layer and the second substrate.

5. The lens structure of claim 1, further comprising:
a second electrically controlled refractive index layer, located in the fourth region of the third layer.

6. The lens structure of claim 1, further comprising:
a second adhesive material layer, located in the fourth region of the third layer.

7. The lens structure of claim 1, further comprising:
an electrically controlled transmittance layer, located in the fourth region of the third layer.

8. The lens structure of claim 1, further comprising:
at least one base lens layer, located above the first substrate or under the second substrate.

9. The lens structure of claim 1, wherein the first substrate is a thin-film transistor liquid crystal panel.

10. The lens structure of claim 1, wherein the surface relief structure is produced using nanoimprinting lithography (NIL) process.

* * * * *